US012811617B2

(12) United States Patent
Griffith et al.

(10) Patent No.: US 12,811,617 B2
(45) Date of Patent: Nov. 24, 2026

(54) WAKEUP RECEIVER

(71) Applicant: TEXAS INSTRUMENTS INCORPORATED, Dallas, TX (US)

(72) Inventors: Danielle Griffith, Richardson, TX (US); Tomas Motos, Hamar (NO); Marius Moe, Fetsund (NO)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 283 days.

(21) Appl. No.: 18/650,605

(22) Filed: Apr. 30, 2024

(65) Prior Publication Data

US 2025/0119171 A1 Apr. 10, 2025

Related U.S. Application Data

(60) Provisional application No. 63/588,804, filed on Oct. 9, 2023.

(51) Int. Cl.
*H04B 1/18* (2006.01)
*H04B 1/16* (2006.01)
*H04W 52/02* (2009.01)

(52) U.S. Cl.
CPC ............ *H04B 1/18* (2013.01); *H04B 1/1607* (2013.01)

(58) Field of Classification Search
None
See application file for complete search history.

(56) References Cited

U.S. PATENT DOCUMENTS

| | | | | |
|---|---|---|---|---|
| 7,218,911 | B2 * | 5/2007 | Shohara | H04W 56/0035 455/343.1 |
| 8,712,483 | B2 * | 4/2014 | Haartsen | H04W 52/0235 455/574 |
| 9,736,779 | B2 * | 8/2017 | Min | H04W 52/0235 |
| 9,743,351 | B2 * | 8/2017 | Jafarian | H04W 52/0212 |
| 10,182,400 | B2 * | 1/2019 | Khazanov | H04W 52/0235 |
| 10,225,713 | B2 * | 3/2019 | Wu | H04N 21/41407 |
| 10,397,869 | B2 * | 8/2019 | Zacchio | H04W 88/06 |

(Continued)

OTHER PUBLICATIONS

CN 102710830, Zhang Fan, Mobile Phone, May 11, 2016, whole document.*

*Primary Examiner* — Tuan A Tran
(74) *Attorney, Agent, or Firm* — Michelle F. Murray; Charles F. Koch

(57) ABSTRACT

A circuit includes a receiver configured to couple to an antenna, configured to have a wakeup mode and an active mode, and to transition from the wakeup mode to the active mode in response to a wakeup signal received through the antenna. The receiver includes an impedance matching circuit coupled with the antenna, a low-noise amplifier coupled with the impedance matching circuit, a mixer coupled with the low-noise amplifier, a radio-frequency reference clock generator coupled with the mixer, a low-pass filter coupled with the mixer, an analog-to digital-converter coupled with the low-pass filter, and a control circuit configured to transition the receiver from the wakeup mode to the active mode in response to the wakeup signal. The low-noise amplifier, the mixer, the radio frequency reference clock generator, and the analog-to-digital converter are configured to be duty-cycled between a sleep state and an active wakeup receive state during the wakeup mode.

20 Claims, 8 Drawing Sheets

(56) References Cited

U.S. PATENT DOCUMENTS

| | | | | |
|---|---|---|---|---|
| 11,463,232 | B2 * | 10/2022 | Ding | H04L 7/0012 |
| 11,474,551 | B1 * | 10/2022 | Tan | G05F 1/565 |
| 11,653,302 | B2 * | 5/2023 | Lv | H04W 88/06<br>370/311 |
| 12,041,545 | B2 * | 7/2024 | Ahn | H04W 52/0229 |
| 12,328,133 | B2 * | 6/2025 | Shibata | H04B 1/0483 |
| 2024/0421825 | A1 * | 12/2024 | Bahr | H03M 1/46 |

* cited by examiner

WAKEUP RECEIVER

RELATED APPLICATIONS

This application hereby claims the benefit of and priority to U.S. Provisional Patent Application No. 63/588,804, titled "WAKEUP RECEIVER", filed on Oct. 9, 2023 and which is hereby incorporated by reference in its entirety.

TECHNICAL BACKGROUND

Low power duty cycled radios face a tradeoff between power consumption and latency in data transmission. To reduce the power, the receiver may be placed in a low power sleep state for a longer time. During this time, the receiver is unreachable, which increases the data transmission latency. Some applications need edge nodes to be able to be reached quickly for time-sensitive data transmission. Examples include car access and smoke detectors. A wakeup receiver can be added to address this problem.

A wakeup receiver may be a second, additional, lower power receiver which is enabled more often than the main receiver, thereby listening for a signal more often. When this signal is received, the main receiver is enabled. This wakeup receiver may be much lower power, which usually limits the sensitivity and range. The wakeup receiver adds extra silicon area, increasing cost. Although a wakeup receiver may address the problems of low latency and/or low power, use of a wakeup receiver may have significant drawbacks in terms of cost and performance, limiting its adoption.

SUMMARY

In an implementation, a circuit includes a receiver configured to couple to an antenna, configured to receive radio signals from the antenna, have a wakeup mode and an active mode, and to transition from the wakeup mode to the active mode in response to a wakeup signal received through the antenna.

The receiver includes an impedance matching circuit coupled with the antenna, a low-noise amplifier coupled with the impedance matching circuit, a mixer coupled with the low-noise amplifier, a radio frequency reference clock generator coupled with the mixer, a low-pass filter coupled with the mixer, an analog-to-digital converter coupled with the low-pass filter, and a control circuit configured to transition the receiver from the wakeup mode to the active mode in response to the wakeup signal.

The low-noise amplifier, the mixer, the radio frequency reference clock generator, and the analog-to-digital converter are configured to be duty cycled between a sleep state and an active wakeup receive state during the wakeup mode.

In another implementation, a circuit includes a receiver including a radio frequency reference clock generator and a control circuit coupled with the radio frequency reference clock generator.

The receiver is configured to transition from a wakeup mode to an active mode in response to a wakeup signal. The control circuit is configured to transition the receiver from the wakeup mode to the active mode by changing a configuration of the radio frequency reference clock generator in response to the wakeup signal, wherein the receiver is configured to be duty cycled between a sleep state and an active wakeup receive state during the wakeup mode.

In a further embodiment, a system includes a transmitter configured to transmit a wakeup signal comprising repeated packets at a first duty cycle, and a receiver configured to transition from a wakeup mode to an active mode in response to receiving the wakeup signal, and operate on a second duty cycle slower than the first duty cycle during the wakeup mode.

The receiver includes a radio frequency reference clock generator configured to use a bulk acoustic wave (BAW) oscillator as a reference clock oscillator for a phase-locked loop (PLL) within the radio frequency reference clock generator.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
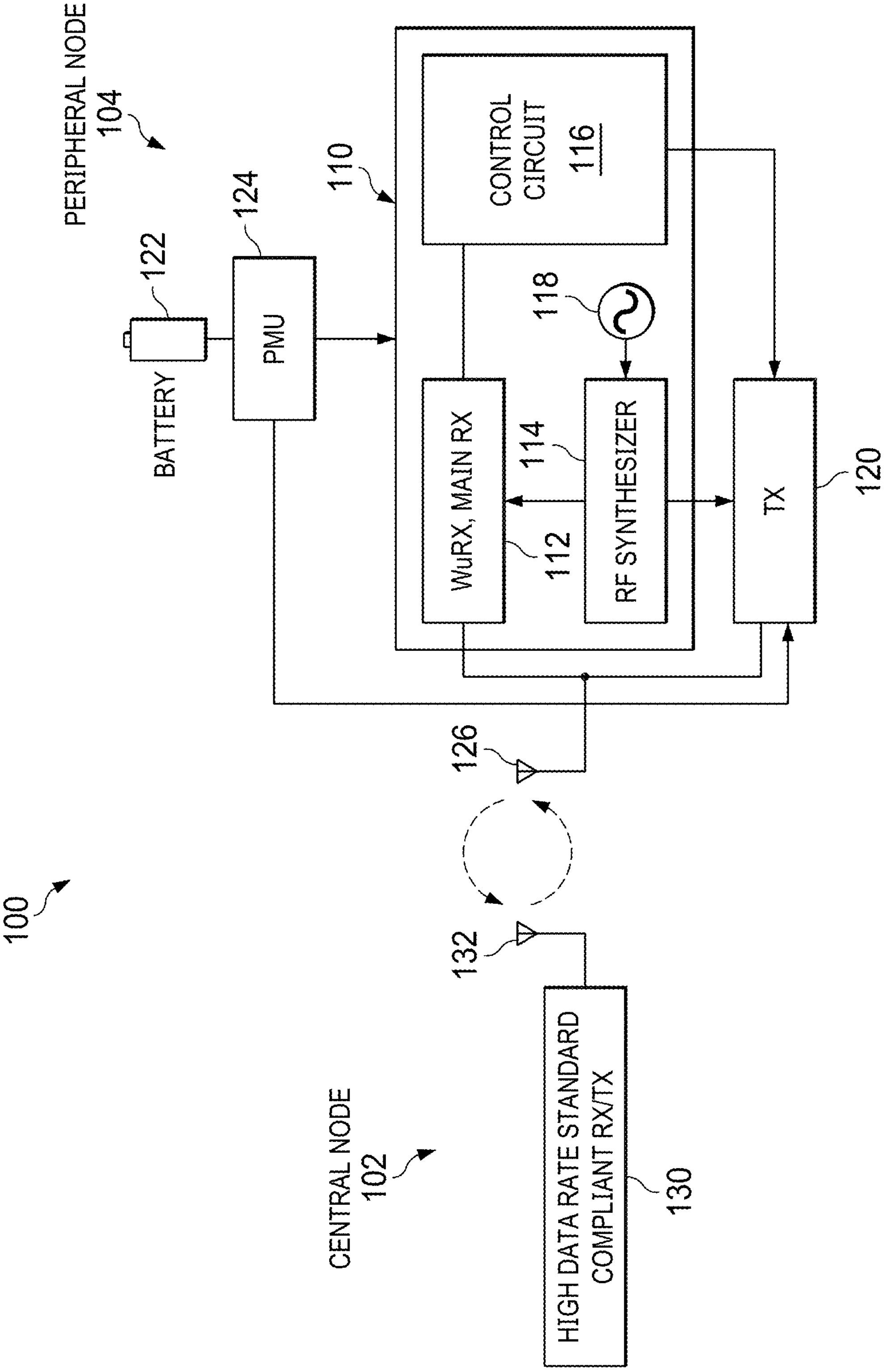
FIG. 1 illustrates an example block diagram of a system including a central node and a peripheral node.

In some examples, an existing main radio is reconfigured to enable fast startup and shutdown. This may include modifications, such as including a reference clock for the radio frequency (RF) phase-locked loop (PLL) that is either always on (e.g., a 32 kHz crystal oscillator) or one that can start in about 1 us (e.g., a high-frequency micro-electro-mechanical-system (MEMS) resonator), a fast-locking RF PLL using pre-calibration techniques, modem hardware for demodulating specific wakeup patterns, and regulators that can start in about 1-2 us. These adaptations allow the device to wake in response to a wakeup code that is frequency shift keying (FSK) modulated and transmitted repeatedly by a standard compliant Bluetooth low energy (BLE) transmitter to be FSK demodulated with 1/10th of the power as a traditional receiver. Duty cycle and power may be traded off as desired, so some devices are configurable to, in a first configuration, use further duty cycling to achieve 0.1% of the average power consumption of a standard solution with the same latency, or, in a second configuration, provide a 20× shorter latency with the same power consumption.

In some examples a circuit is provided that includes: an antenna, an impedance matching circuit coupled to the antenna, a low-noise amplifier coupled to the impedance matching circuit, and a mixer coupled to the low-noise amplifier. A radio frequency reference clock generator is coupled to the mixer and may include a bulk acoustic wave (BAW) or similar high-Q resonator for an accurate and fast-starting reference clock. The radio frequency reference clock generator may support pre-calibration (by re-using calibration results and error estimates from a previous operation) for faster start up.

The circuit device may further include a low-pass filter coupled to the mixer, an analog-to-digital converter (ADC) coupled to the low-pass filter, and a control circuit configured to produce a wakeup signal based on an output of the analog-to-digital converter. The modulation format for the wakeup code that produces causes the controller to produce the wakeup signal may be selected such that the wakeup code may be sent by standard compliant hardware and is backwards compatible. The low-noise amplifier, the mixer, the radio frequency reference clock generator, and the analog-to-digital converter may then be duty cycled, waking to detect whether the wakeup code has been sent.

Other comparable wakeup receivers rely on on-off keying (OOK) demodulation. This limits the sensitivity compared to FSK. Other solutions do not have a fast-starting accurate clock for the radio frequency reference clock generator, so they either 1) have higher power consumption if they use a crystal oscillator as an accurate clock for the radio, 2) rely on uncertain intermediate frequency (IF) signals, which degrades the sensitivity significantly, or 3) recalibrate an open-loop voltage-controlled oscillator (VCO), which increases the average power.

In contrast, some embodiments of the present disclosure provide wakeup radio functionality with simultaneous low power consumption, low latency, and sensitivity as good as the main radio functionality. This allows a wakeup radio to become a viable solution to reduce the power consumption of a wireless device, without requiring updates to the transmitter (TX) broadcasting the wakeup code.

FIG. 1 illustrates an example block diagram of a system 100 including a central node 102 and a peripheral node 104. In this example embodiment, central node 102 includes a high data rate standard compliant receiver and transmitter 130 and an antenna 132. Peripheral node 104 includes a power supply, such as a battery 122, power management unit (PMU) 124, receiver 110, transmitter 120, and antenna 126.

During a wakeup mode, receiver 110 is operated at a duty cycle such that it actively processes signals received through antenna 126 for a short period of each duty cycle to determine whether to transition into an active mode. In the wakeup mode, receiver 110 is in a sleep state for most of the duty cycle, and actively processing received signals during a short period of each duty cycle (called the active wakeup receive state). If no wakeup signal is detected while receiver 110 is actively processing received signals in the active wakeup receive state, receiver 110 goes back into a sleep state for the remainder of the duty cycle. When in wakeup mode, receiver 110 toggles between a sleep state and an active wakeup receive state each period of the duty cycle. In some embodiments when transitioning between the sleep state and the active wakeup receive state, control circuit 116 only executes instructions and activates circuits used to perform the receive operation. In some example embodiments, control circuit 116 controls receiver 110 during wakeup mode by transitioning receiver 110 from the sleep state to the active wakeup receive state at a selected duty cycle.

During wakeup mode, when receiver 110 is transitioned from the sleep state to the active wakeup receive state, only circuits within receiver 110 used to perform a receive operation are started as quickly as possible. All other operations that are not used to perform a receive operation are skipped. Any operations, instructions, and circuits that are not used for a receive operation are not executed or operated. This allows receiver 110 to transition into an active wakeup receive state as quickly as possible.

Power management unit (PMU) 124 includes a linear and low-dropout battery regulator (LDO) (illustrated in FIG. 8 and described below) to provide power to transmitter 120 with a <10 us startup time and to provide power to receiver 110 with a <2 us startup time. In some embodiments, a DC-DC convertor may also be used between the battery and the low-dropout battery regulator. Both the LDO and the DC-DC converter may utilize a reference voltage, provided by a bandgap voltage reference in some example embodiments. In some example embodiments, while the receiver 110 is in the sleep state, the bandgap voltage reference is sampled and held to reduce power. This also provides for a fast transition from the sleep state to the active wakeup receive state while in the wakeup mode, and a quicker transition from the wakeup mode to the active mode.

Receiver 110 includes a fast-startup reference clock 118 such as a bulk acoustic wave (BAW) oscillator, crystal oscillator, or any other accurate, fast-starting reference clock configured to quickly provide a stable reference clock signal to a phase-locked loop (PLL) within radio frequency (RF) synthesizer 114 when receiver 110 transitions from a sleep state to an active wakeup receive state during the wakeup mode. In this example embodiment, receiver 110 includes a BAW oscillator configured to provide a reference clock signal to the PLL within RF synthesizer 114.

By using a BAW oscillator to provide a reference clock signal to the PLL, embodiments described herein are able to achieve very accurate frequency stability with good sensitivity. In some example embodiments, this combination provides sufficient frequency accuracy to receive 2 Mbps BLE compliant GFSK modulation signals without estimating the frequency offset. Since calculating this estimate is time consuming, receiver 110 is able to achieve faster startup by skipping this estimation step.

Receiver 110 also includes control circuit 116, along with other wakeup receiver and main receiver 112 circuits. When a wakeup signal is received from central node 102 through antenna 126, while receiver 110 is actively processing signals during the active wakeup receive state in the wakeup mode, and processed by control circuit 116, control circuit 116 then re-configures receiver 110 from wakeup mode to active mode, and receiver 110 remains active for the duration of the active mode.

Figure 2:
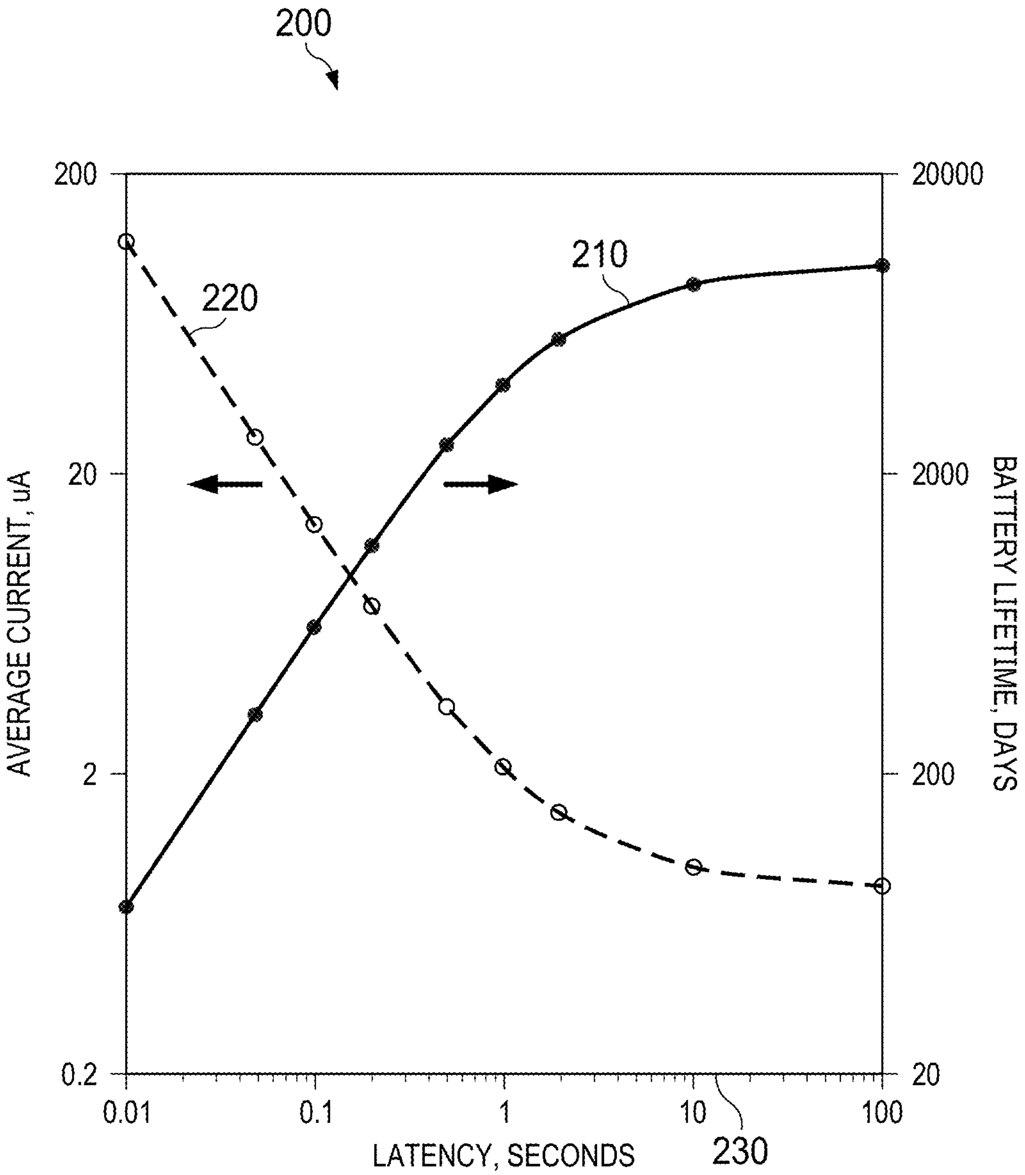
FIG. 2 graphically illustrates relationships between current, latency and battery lifetime.

FIG. 2 graphically illustrates relationships between current 220, latency 230, and battery lifetime 210. This graph illustrates the relationships between latency 230 (on the horizontal axis), average current 220 (on the left vertical axis), and battery lifetime 210 (on the right vertical axis) for an example embodiment of a receiver, such as receiver 110 from FIG. 1.

The battery lifetime curve 210 illustrates the fact that as receiver designs reduce latency 230, they also reduce battery lifetime 210. The average current curve 220 illustrates the fact that as receiver designs reduce average current 220, they also increase latency 230.

Figure 3:
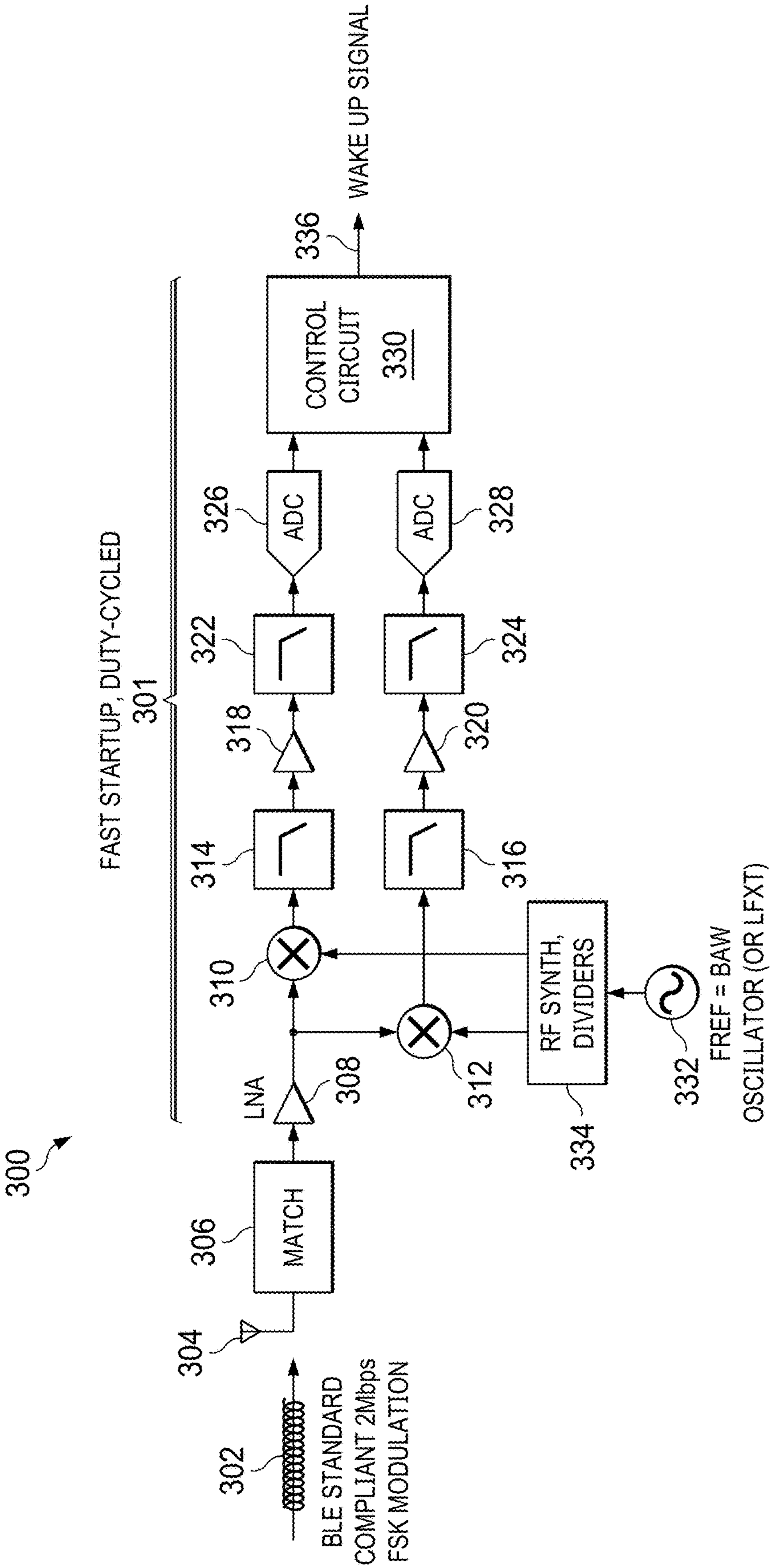
FIG. 3 illustrates an example block diagram of a receiver in a peripheral node.

FIG. 3 illustrates an example block diagram of a receiver 301 in a peripheral node 300 such as those illustrated in FIG. 1. In this example embodiment, peripheral node 300 includes antenna 304 configured to receive Bluetooth low energy (BLE) standard-compliant signals 302. In this example, these Bluetooth low energy (BLE) standard-compliant signals 302 utilize 2 MBPS frequency shift keying (FSK) modulation, however other example embodiments may use different frequencies of modulation. In some example embodiments receiver 301 is configured to detect a blockage on a desired Bluetooth channel, and in response, switch to an alternate Bluetooth channel.

Peripheral node 300 also includes impedance matching circuit 306 and receiver 301. Impedance matching circuit 306 is configured to match the impedance of antenna 304 to an input of receiver 301. In some example embodiments, impedance matching circuit 306 is included within receiver 301.

Receiver 301 includes separate in-phase and quadrature (I and Q) paths driven by low-noise amplifier 308. In this example embodiment, the I path includes mixer 310 coupled with the low-noise amplifier 308, first and second low-pass filters 314 and 322 on either side of gain stage 318, and analog-to-digital converter (ADC) 326 coupled with the low-pass filter 322. In this example embodiment, the Q path includes mixer 312 coupled with the low-noise amplifier 308, first and second low-pass filters 316 and 324 on either side of gain stage 320, and analog-to-digital converter (ADC) 328 coupled with the low-pass filter 324. Receiver 301 also includes a radio frequency reference clock generator coupled with the mixers 310 and 312. In this example embodiment, the radio frequency reference clock generator includes oscillator 332 and RF synthesizer 334.

Figure 8:
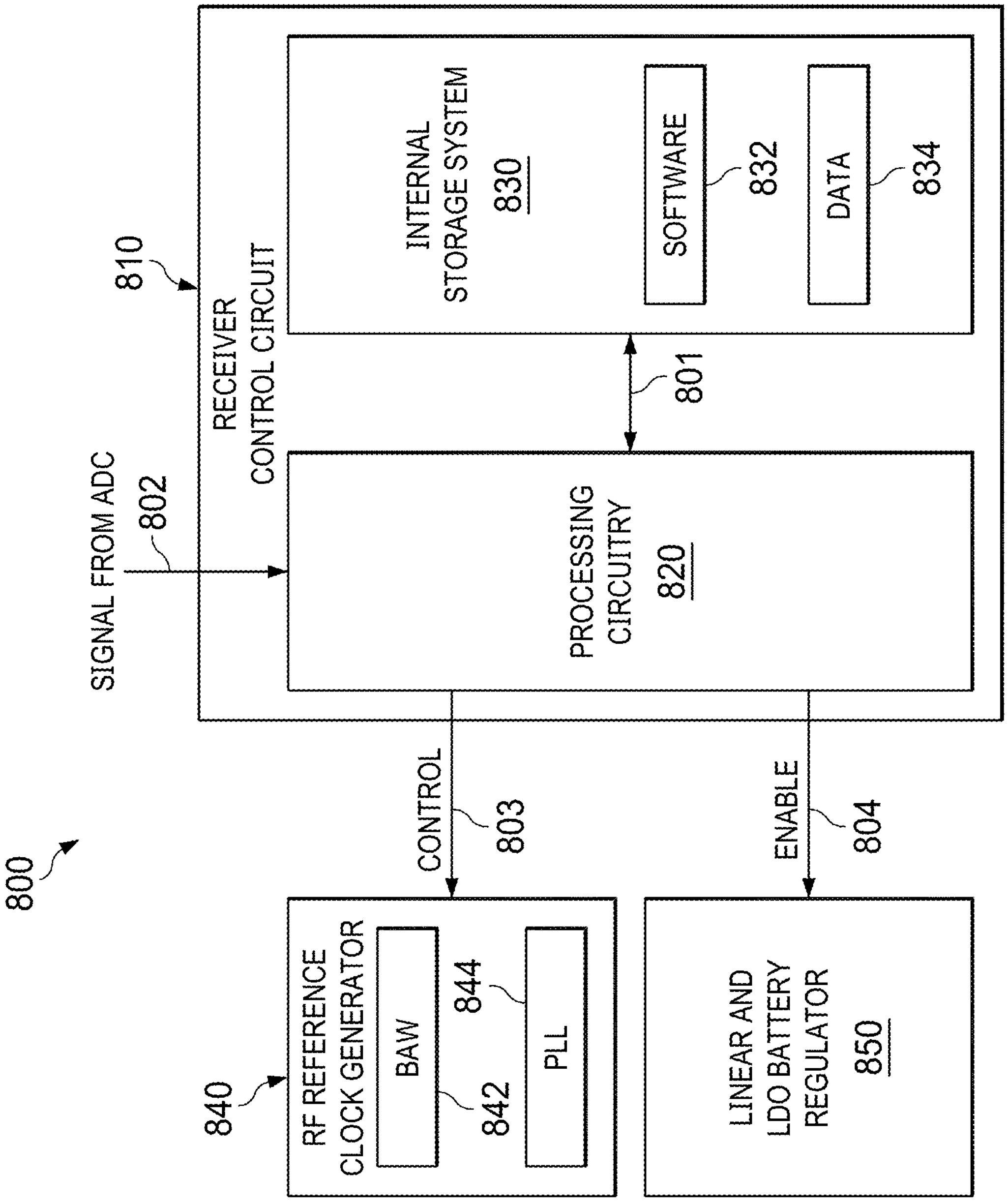
FIG. 8 illustrates an example block diagram of a receiver in a peripheral node.

Receiver 301 further includes control circuit 330 which, in some embodiments, is configured to toggle receiver 301 between the sleep state and the active wakeup receive state each duty cycle while in the wakeup mode. These control and enable signals are illustrated in FIG. 8 and described in detail below. Control circuit 330 is coupled with the analog-to-digital converters (ADC) 326 and 328 from the I and Q paths, and configured to receive digital signals from the ADCs 326 and 328, process the digital signals, and to determine if the digital signals include a wakeup signal 336. If control circuit 330 detects a wakeup signal 336, it is configured to re-configure receiver 301 from wakeup mode to active mode.

This re-configuration from wakeup mode to active mode may include any number of configuration changes within receiver 301. For example, when in wakeup mode, receiver 301 transitions to the active wakeup receive state by only executing instructions and starting portions of the hardware that are used for receiver 301 to operate in an active wakeup receive state. Also, in wakeup mode when transitioning from the sleep state to the active wakeup receive state, calibration results and error estimates from a previous operation are re-used by RF synthesizer 334. This allows control circuit 330 to skip many instructions that are executed during the regular setup of a receive state within the active mode. In active mode, all of these instructions are executed and new calibrations and error estimates are created.

The frontend of receiver 301, including the antenna, mixer, low-pass filter, and ADC, has inherent DC and low-frequency noise that is estimated and removed using a DC offset. DC offsets are continuously refined during operation to optimize sensitivity. In some example embodiments, these DC offsets are stored in memory for re-use in the next transition from the sleep state to the active wakeup receive state. By re-using a DC offset from a previous operation, receiver 301 is able to transition from the sleep state to the active wakeup receive state faster. In some embodiments, the DC offsets comprise digital data used within control circuit 330, while in other embodiments, the DC offset correction is performed between the output of mixers 310 and 312 and ADCs 326 and 328 respectively.

Figure 4:
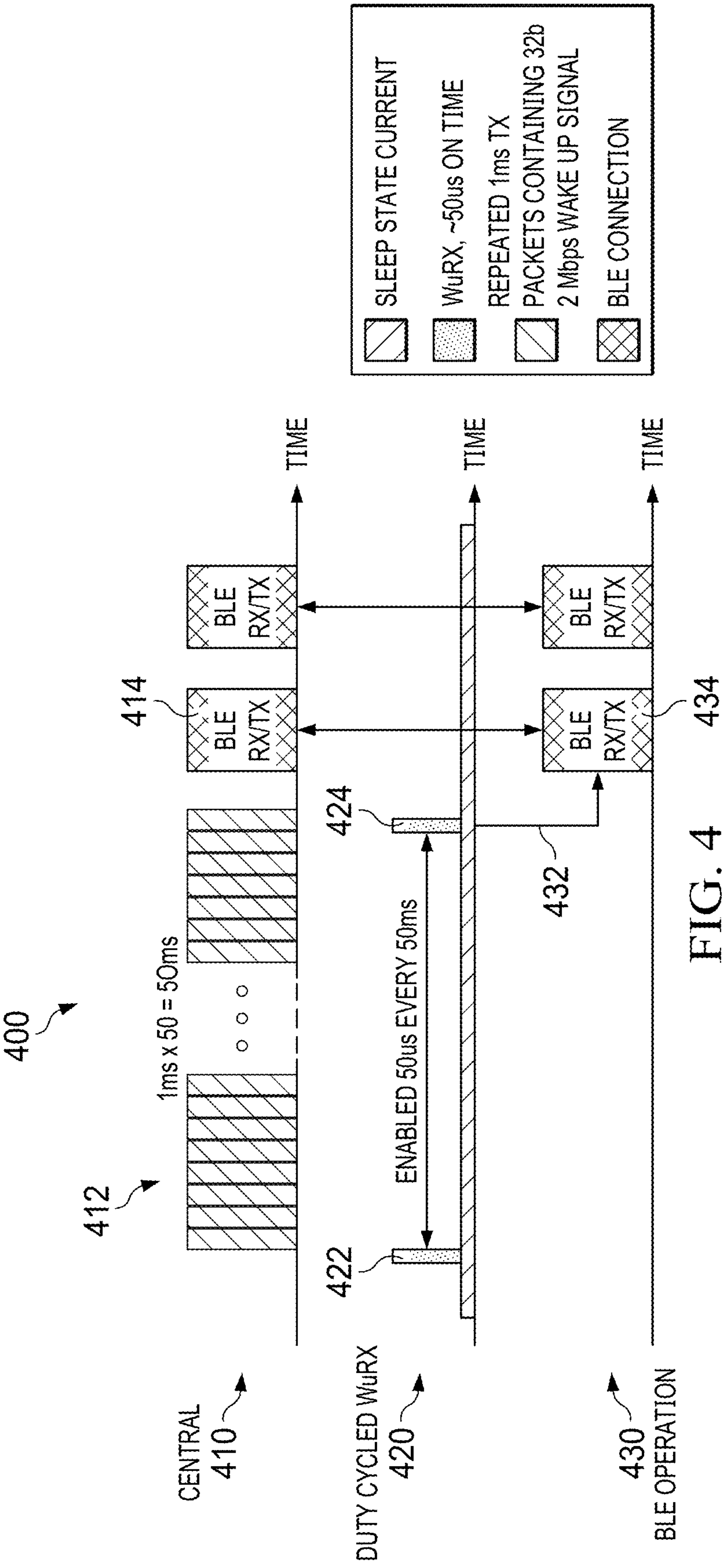
FIG. 4 illustrates an example timing diagram of radio communications between a central node and a peripheral node.

FIG. 4 illustrates an example timing diagram of radio communications between a central node 410 and a peripheral node 420. In this example timing diagram, time is plotted on the horizontal axis. Peripheral node 420 includes a duty cycled wakeup receiver such as receiver 110 from FIG. 1. In this example embodiment, the duty cycled wakeup receiver is enabled (in the active wakeup receive state) for 50 us every 50 ms for a 0.1% duty cycle. In this illustration, it is active to receive signals at times 422 and 424, and in a sleep state the remainder of the time.

Central node 410 begins transmitting a wakeup signal 412 having a duty cycle greater than the duty cycle (e.g., the interval between active receive states) of the wakeup receiver. In this example embodiment, the central node 410 transmits 1 ms packets containing a wakeup signal for 50 ms to ensure that the wakeup receiver will be in an active wakeup receive state at least once during the 50 ms.

In other embodiments, the packets containing the wakeup signal may be up to 1 ms long, allowing any BLE compliant radio to be used as the wakeup signal transmitter. In such embodiments, there is necessarily a time gap between the end of one packet and the start of the next packet in the wakeup pattern. This may cause the receiver to either listen longer for the wakeup pattern (requiring higher power), or to potentially miss the occasional wakeup event (resulting in higher latency). Therefore, in some example embodiments, the transmitter may optionally transmit a continuous 50 ms repeated wakeup pattern.

In this example, the wakeup receiver receives the wakeup signal at time 424 and transitions to active mode 432 so that it may exchange Bluetooth low energy (BLE) 430 packets 414 and 434 with the central node 410.

Figure 5:
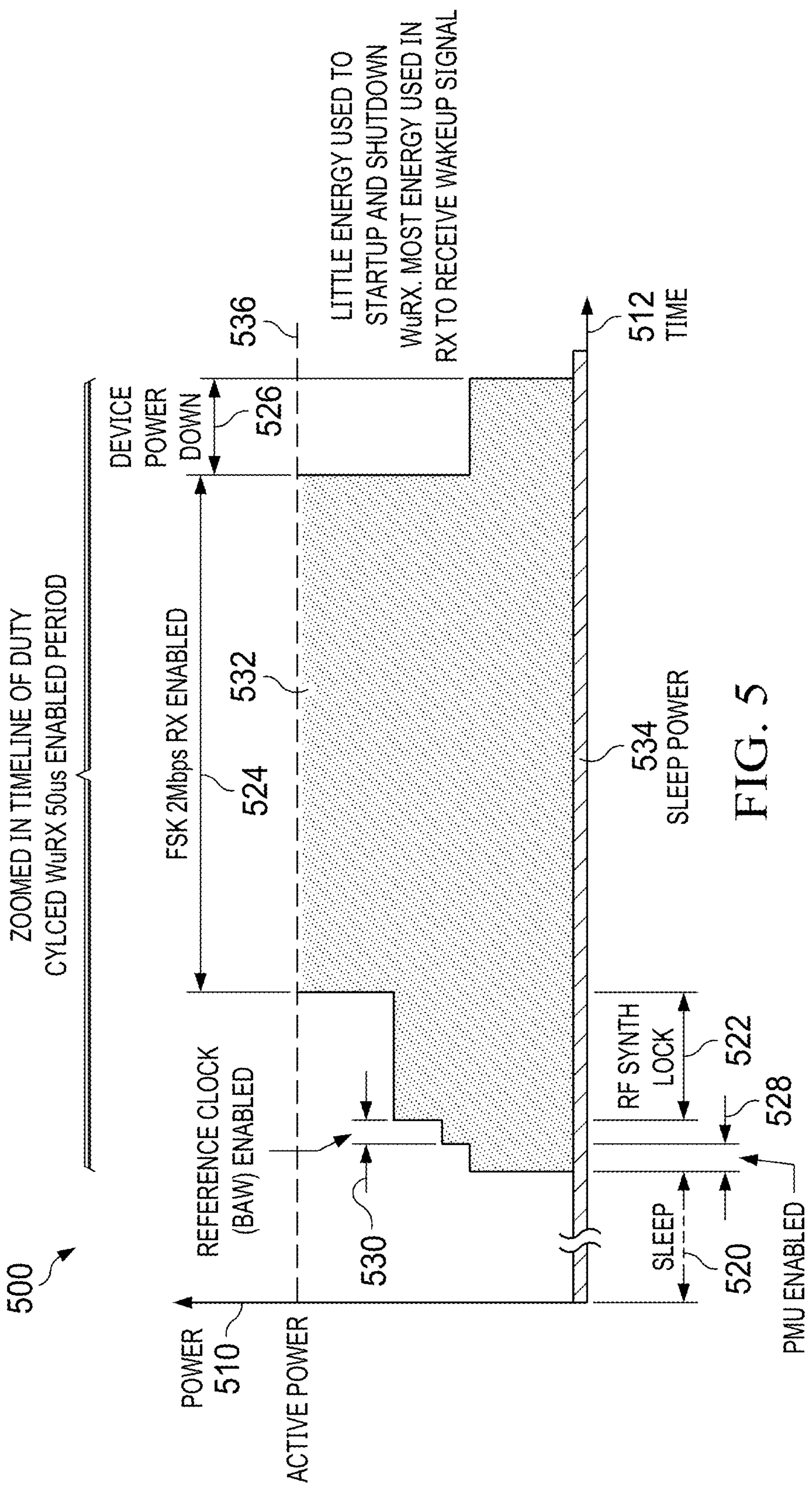
FIG. 5 illustrates example power consumption of a receiver in a peripheral node in a wakeup mode.

FIG. 5 illustrates example power consumption of a receiver in a peripheral node in a wakeup mode. In this example, one of the times that peripheral node 420 from FIG. 4 is in an active wakeup receive state 532 while in wakeup mode (such as at time 422) is enlarged to illustrate the power consumption of the duty cycled wakeup receiver as it is enabled (active wakeup receive state) to detect a wakeup signal through the time it is powered down to wait for the next cycle.

In this example embodiment, time 512 is illustrated on the horizontal axis and power 510 is illustrated on the vertical axis. Sleep power 534 is very low during the 99.9% of time that the duty cycled wakeup receiver is disabled in the sleep state. As in the example illustrated in FIG. 4, the wakeup receiver is enabled in the active wakeup receive state for 50 us every 50 ms and FIG. 5 illustrates one of the 50 us periods that the wakeup receiver is in the active wakeup receive state.

In this example, the wakeup receiver sleeps during time 520, the power management unit is enabled at time 528, the BAW oscillator is enabled at time 530 and the RF synthesizer locks during time 533. In this example embodiment, the RF synthesizer re-uses calibration results and error estimates from a previous operation, providing a faster lock. Once the RF synthesizer locks, the receiver is in an active wakeup receive state and searching for a wakeup signal from the central node 410 during time 524. If no wakeup signal is detected, the receiver powers down in a sleep state during time 526.

Figure 6:
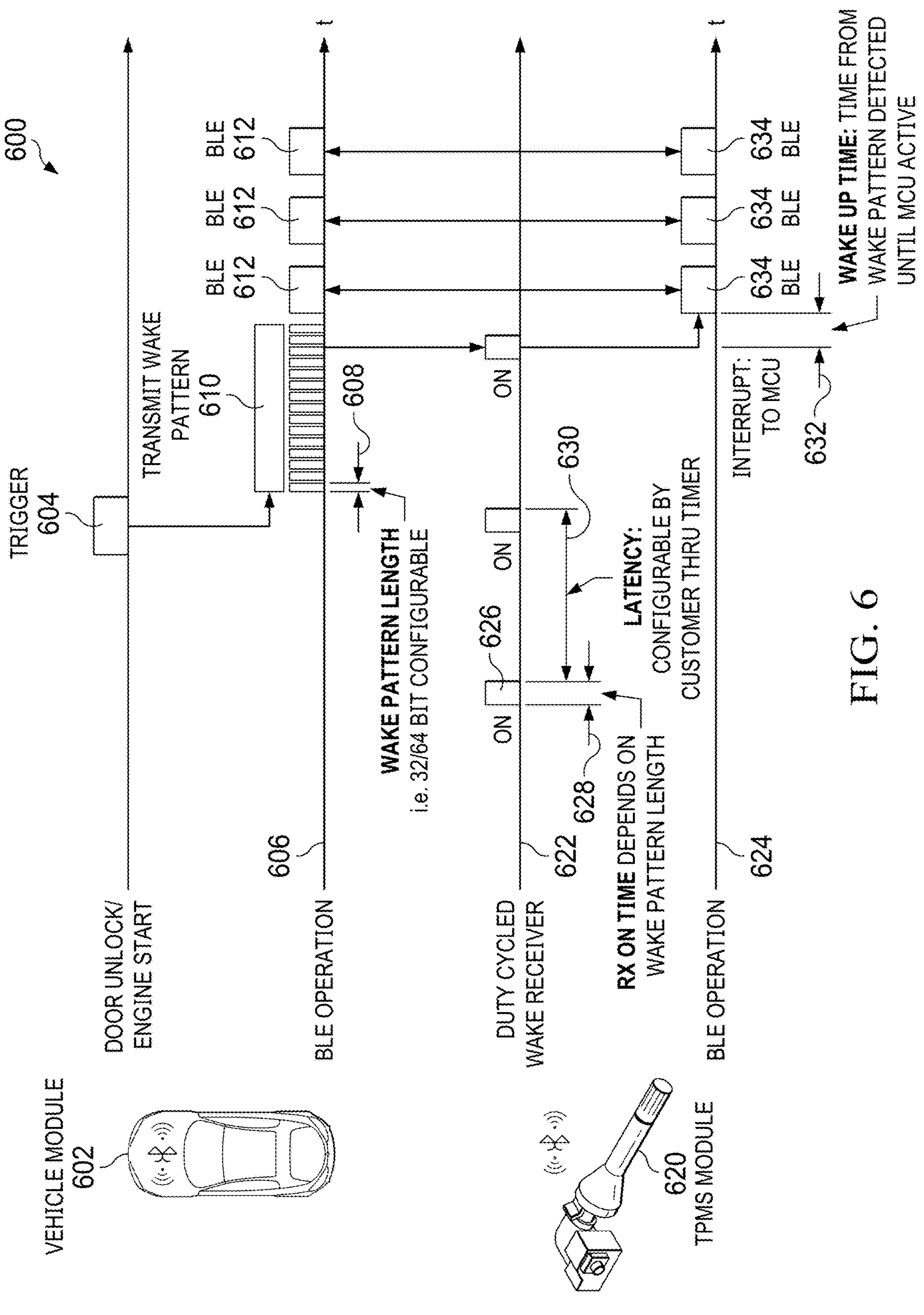
FIG. 6 illustrates an example timing diagram of radio communications between a central node and a peripheral node.

FIG. 6 illustrates an example timing diagram 600 of radio communications between a central node 602 and a peripheral node 620. In this example embodiment, the central node is a vehicle module 602 and the peripheral node is a tire pressure monitoring system (TPMS) module 620 communicate to transmit a tire pressure measurement to the vehicle module 602.

FIG. 6 illustrates the operation of vehicle module 602 with graphs of a triggering mechanism 604, such as a door unlock or an engine start, and the BLE operation of the vehicle module 602. FIG. 6 further illustrates the operation of the duty cycled wakeup receiver 622 and its BLE operation 624.

In this example embodiment, the duty cycled wakeup receiver 622 is enabled in an active wakeup receive state 626 for a short period of each duty cycle. In some example embodiments, the receiver 622 active wakeup receive state time 628 is based on the pattern length of the wakeup signal 610, and the latency 630 may also be configurable. In some example embodiments, a 32-bit pattern is used, however, this pattern is configurable as a tradeoff between power (short pattern) and robustness (longer pattern).

When the wakeup receiver 622 receives a wakeup signal 610, after a wakeup time 632, it transitions the receiver into an active mode and the TPMS module 620 is able to exchange BLE communication packets 612 and 634 with the vehicle module 602 in order to send tire pressure measurements to the vehicle module 602.

In this example embodiment, when the door unlock or engine start triggers 604 a request for tire pressure, vehicle module 602 begins transmitting a wakeup signal 610 having a wake pattern length 608. In various embodiments this wake pattern may be configurable in length.

Figure 7:
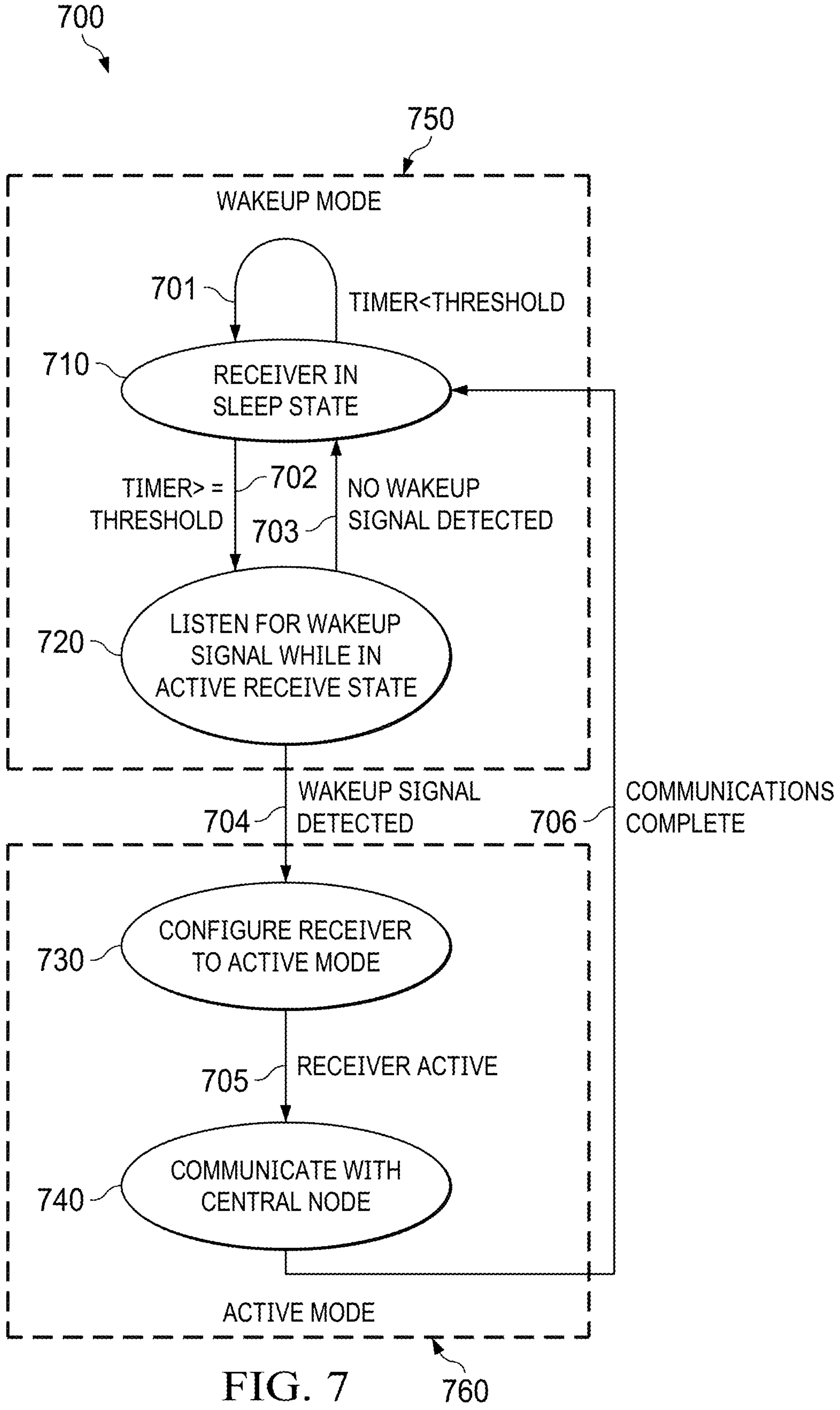
FIG. 7 illustrates an example state diagram of operation of a receiver control circuit in a peripheral node receiver.

FIG. 7 illustrates an example state diagram 700 of operation of a receiver control circuit in a peripheral node receiver. This example state diagram 700 illustrates the operation of a receiver control circuit (such as control circuit from FIG. 1) in a system such as the vehicle module 602 and TPMS module 620 illustrated in FIG. 6. In this example embodiment, the receiver operates in either the wakeup mode 750 or the active mode 760.

In this example embodiment, the receiver begins in a sleep state (state 710) while in the wakeup mode 750 where it remains as long as a timer is less than a threshold 701. When the timer meets or exceeds the threshold 702 the receiver is placed in an active wakeup receive state (state 720) by the control circuit to listen for a wakeup signal. If no wakeup signal is detected 703, the receiver is disabled and goes back into the sleep state (state 710) while in the wakeup mode 750.

If a wakeup signal is detected 704 the control circuit re-configures the receiver to an active mode 760 (state 730). Once the receiver is active 705 it transitions to state 740 where it communicates with a central node over BLE signals. When communications are complete 706 it transitions back into a sleep state (state 710) within the wakeup mode 750.

FIG. 8 illustrates an example block diagram of a receiver 800 in a peripheral node (such as receiver 110 from FIG. 1) including receiver control circuit 810, radio frequency reference clock generator 840, and linear and low-dropout battery regulator 850.

In this example embodiment, receiver control circuit 810 includes processing circuitry 820 and internal storage system 830. Processing circuitry 820 is coupled with internal storage system 830 through link 801. Processing circuitry 820 is configured to receive a digital signal from an analog-to-digital converter within receiver 800, process the signal to determine if it is a wakeup signal, and to provide control signal 803 to radio frequency reference clock generator 840, and enable signal 804 to linear and low-dropout battery regulator 850, to transition them between wakeup mode and active mode in response to the wakeup signal.

In some embodiments, processing circuitry 820 is also configured to toggle receiver 800 between a sleep state and an active wakeup receive state at a selected duty cycle while in the wakeup mode. During wakeup mode, when processing circuitry 820 transitions receiver 800 between the sleep state and the active wakeup receive state it only executes instructions and activates circuits used to perform the receive operation. Also, when transitioning transitions receiver 800 between the sleep state and the active wakeup receive state processing circuitry 820 controls RF reference clock generator 840 through control signal 803 to re-use calibration results and error estimates from a previous operation in order to fast-lock RF reference clock generator 840.

Processing circuitry 820 comprises electronic circuitry configured to process the signal from the ADC 802, determine if it comprises a wakeup signal, and re-configure receiver 800 from wakeup mode to active mode when a wakeup signal is detected, as described above with respect to FIG. 7.

Processing circuitry 820 may comprise microprocessors and other circuitry that retrieves and executes software 832. Examples of processing circuitry 820 include general purpose central processing units, application specific processors, and logic devices, as well as any other type of processing device, combinations, or variations thereof. Processing circuitry 820 may be implemented within a single processing device, such as an application specific integrated circuit (ASIC), but may also be distributed across multiple processing devices or sub-systems that cooperate in executing program instructions.

Internal storage system 830 may comprise any non-transitory computer readable storage media capable of storing software 832 that is executable by processing circuitry 820. Internal storage system 830 may also include various data structures 834 which comprise one or more registers, databases, tables, lists, or other data structures. Storage system 830 may include volatile and nonvolatile, removable and non-removable media implemented in any method or technology for storage of information, such as computer readable instructions, data structures, program circuits, or other data.

Storage system 830 may be implemented as a single storage device but may also be implemented across multiple storage devices or sub-systems co-located or distributed relative to each other. Storage system 830 may comprise additional elements, such as a controller, capable of communicating with processing circuitry 820. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which may be used to store the desired information and that may be accessed by an instruction execution system, as well as any combination or variation thereof.

Software 832 may be implemented in program instructions and among other functions may, when executed by receiver control circuit 810 in general, or processing circuitry 820 in particular, direct receiver control circuit 810, or processing circuitry 820, to operate as described herein to re-configure receiver 800 from wakeup mode to active mode when a wakeup signal is detected. Software 832 may include additional processes, programs, or components, such as operating system software, database software, or application software. Software 832 may also comprise firmware or some other form of machine-readable processing instructions executable by elements of processing circuitry 820.

In general, software 832 may, when loaded into processing circuitry 820 and executed, transform processing circuitry 820 overall from a general-purpose computing system into a special-purpose computing system customized to operate as described herein for re-configuring a receiver 800, among other operations. Encoding software 832 on internal storage system 830 may transform the physical structure of internal storage system 830. The specific transformation of the physical structure may depend on various factors in different implementations of this description. Examples of such factors may include, but are not limited to the technology used to implement the storage media of internal storage system 830 and whether the computer-storage media are characterized as primary or secondary storage.

For example, if the computer-storage media are implemented as semiconductor-based memory, software 832 may transform the physical state of the semiconductor memory when the program is encoded therein. For example, software 832 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above may be combined in various ways to form multiple embodiments. As a result, the invention is not limited to the specific embodiments described above, but only by the claims and their equivalents.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be coupled to at least some of the passive elements and/or the sources to form the described structure either at a time of manufacture or after a time of manufacture, for example, by an end-user and/or a third-party.

While certain components may be described herein as being of a particular process technology, these components may be exchanged for components of other process technologies. Circuits described herein are reconfigurable to include the replaced components to provide functionality at least partially similar to functionality available prior to the component replacement. Components shown as resistors, unless otherwise stated, are generally representative of any one or more elements coupled in series and/or parallel to provide an amount of impedance represented by the shown resistor. For example, a resistor or capacitor shown and described herein as a single component may instead be multiple resistors or capacitors, respectively, coupled in parallel between the same terminals. For example, a resistor or capacitor shown and described herein as a single component may instead be multiple resistors or capacitors, respectively, coupled in series between the same two terminals as the single resistor or capacitor.

Uses of the phrase "ground voltage potential" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. A circuit comprising:
- a receiver configured to couple to an antenna, and configured to:
  - receive radio signals from the antenna;
  - have a wakeup mode and an active mode; and
  - transition from the wakeup mode to the active mode in response to a wakeup signal received through the antenna;
- wherein the receiver comprises:
  - a control circuit configured to transition the receiver from the wakeup mode to the active mode in response to the wakeup signal, wherein the receiver is configured to be duty cycled between a sleep state and an active wakeup receive state during the wakeup mode, and wherein the receiver is configured to re-use a DC offset from a previous operation when transitioning from the sleep state to the active wakeup receive state during the wakeup mode.

2. The circuit of claim 1, wherein the receiver further comprises the antenna.

3. The circuit of claim 1, wherein the receiver includes a radio frequency reference clock generator that is configured to use a bulk acoustic wave (BAW) oscillator as a reference clock oscillator for a phase-locked loop (PLL) within the radio frequency reference clock generator.

4. The circuit of claim 1, wherein the receiver includes a radio frequency reference clock generator that is configured to re-use calibration results and error estimates from a previous operation when transitioning from the sleep state to the active wakeup receive state during the wakeup mode.

5. The circuit of claim 1, comprising a low-dropout voltage regulator coupled with a battery and having a startup time of less than 2 microseconds.

6. The circuit of claim 1, wherein the DC offset comprises digital data stored in a memory.

7. The circuit of claim 1, wherein the receiver has lower latency while in the wakeup mode than it has while in the active mode.

8. The circuit of claim 1, wherein the receiver consumes less power while in the wakeup mode than it consumes while in the active mode.

9. The circuit of claim 1, wherein the wakeup signal is a Bluetooth low energy (BLE) compliant radio signal having frequency shift keying (FSK) frequency modulation.

10. The circuit of claim 1, wherein the receiver includes:
- an antenna;

an impedance matching circuit coupled with the antenna;

a low-noise amplifier coupled with the impedance matching circuit;

a mixer coupled with the low-noise amplifier;

a radio frequency reference clock generator coupled with the mixer;

a low-pass filter coupled with the mixer; and an analog-to-digital converter coupled with the low-pass filter;

wherein the wakeup signal comprises repeated packets having a faster duty cycle than the low-noise amplifier, the mixer, the radio frequency reference clock generator, and the analog-to-digital converter.

11. A circuit comprising:

a receiver configured to transition from a wakeup mode to an active mode in response to a wakeup signal, the receiver comprising:

a radio frequency reference clock generator; and a control circuit coupled with the radio frequency reference clock generator, and configured to transition the receiver from the wakeup mode to the active mode by changing a configuration of the receiver in response to the wakeup signal, wherein the receiver is configured to be duty cycled between a sleep state and an active wakeup receive state during the wakeup mode, and wherein the radio frequency reference clock generator is configured to re-use calibration results and error estimates from a previous operation when transitioning from the sleep state to the active wakeup receive state during the wakeup mode.

12. The circuit of claim 11, wherein the radio frequency reference clock generator is configured to use a bulk acoustic wave (BAW) oscillator as a reference clock oscillator for a phase-locked loop (PLL) within the radio frequency reference clock generator.

13. The circuit of claim 11, wherein the receiver is configured to determine new calibration results and error estimates during a subsequent active mode.

14. The circuit of claim 11, wherein the receiver includes a low-dropout (LDO) voltage regulator coupled with a power supply, the LDO voltage regulator having a startup time of less than 2 microseconds.

15. The circuit of claim 11, wherein the receiver is configured to re-use a DC offset from a previous operation when transitioning from the sleep state to the active wakeup receive state during the wakeup mode.

16. The circuit of claim 11, wherein the receiver has lower latency and consumes less power while in the wakeup mode than it has while in the active mode.

17. The circuit of claim 11, wherein the wakeup signal is a Bluetooth low energy (BLE) compliant radio signal having frequency shift keying (FSK) frequency modulation.

18. The circuit of claim 17, wherein the receiver is configured to detect a blockage on a desired Bluetooth channel, and in response, switch to an alternate Bluetooth channel.

19. The circuit of claim 11, wherein the receiver further comprises an antenna.

20. A system comprising:

a transmitter configured to transmit a wakeup signal comprising repeated packets at a first duty cycle; and a receiver configured to:

transition from a wakeup mode to an active mode in response to receiving the wakeup signal; and operate on a second duty cycle slower than the first duty cycle during the wakeup mode;

wherein the receiver comprises a radio frequency reference clock generator configured to use a bulk acoustic wave (BAW) oscillator as a reference clock oscillator for a phase-locked loop (PLL) within the radio frequency reference clock generator, and wherein during the wakeup mode the receiver is configured to re-use a DC offset and/or a calibration result from a previous operation, and wherein during the active mode the receiver is configured to determine and use a new DC offset and/or new calibration result.

* * * * *